(12) United States Patent  
Miller

(10) Patent No.: US 9,476,244 B2  
(45) Date of Patent: Oct. 25, 2016

(54) BELT TENSIONING MOTOR MOUNT

(71) Applicant: Christopher B. Miller, Phoenix, AZ (US)

(72) Inventor: Christopher B. Miller, Phoenix, AZ (US)

( * ) Notice: Subject to any disclaimer, the term of this patent is extended or adjusted under 35 U.S.C. 154(b) by 0 days.

(21) Appl. No.: 14/664,849

(22) Filed: Mar. 21, 2015

(65) Prior Publication Data

US 2016/0024833 A1    Jan. 28, 2016

Related U.S. Application Data

(60) Provisional application No. 61/999,416, filed on Jul. 24, 2014.

(51) Int. Cl.
| | |
|---|---|
| *E05F 15/643* | (2015.01) |
| *F16H 7/14* | (2006.01) |
| *E06B 3/46* | (2006.01) |
| *F16H 7/02* | (2006.01) |
| *F16H 7/08* | (2006.01) |

(52) U.S. Cl.
CPC ........... *E05F 15/643* (2015.01); *E06B 3/4636* (2013.01); *F16H 7/02* (2013.01); *F16H 7/14* (2013.01); *E05Y 2201/43* (2013.01); *E05Y 2201/672* (2013.01); *E05Y 2600/626* (2013.01); *E05Y 2900/132* (2013.01); *F16H 2007/0802* (2013.01); *F16H 2007/0842* (2013.01)

(58) Field of Classification Search
CPC .. E05F 15/643; E05Y 2900/132; F16H 7/14; F16H 7/02; F16H 2007/0842; F16H 2007/0802; E06B 3/4636; B65G 23/22
See application file for complete search history.

(56) References Cited

U.S. PATENT DOCUMENTS

| | | | | |
|---|---|---|---|---|
| 1,594,513 | A * | 8/1926 | Ainsworth | E05F 15/643 109/3 |
| 2,661,777 | A * | 12/1953 | Hitchcock | B27B 5/243 474/114 |
| 2,664,757 | A * | 1/1954 | Shaw | F16H 7/14 474/27 |
| 2,910,879 | A * | 11/1959 | Hanks | D01H 1/241 248/657 |
| 2,967,688 | A * | 1/1961 | Sachers | F16H 7/14 248/657 |
| 3,115,945 | A * | 12/1963 | Dry | B60G 9/00 105/106 |
| 3,421,724 | A * | 1/1969 | Cornell | F16M 7/00 248/657 |

(Continued)

FOREIGN PATENT DOCUMENTS

| | | | | |
|---|---|---|---|---|
| CN | 201282390 | * | 7/2009 | |
| CN | 101992935 | * | 3/2011 | B65G 23/22 |

*Primary Examiner* — Justin Rephann  
(74) *Attorney, Agent, or Firm* — Morgan Law Offices, PLC

(57) ABSTRACT

A belt tensioning motor mount comprises a support plate; a motor mount holding a motor, the motor mount slidably attached to the support plate; and a tension adjustor disposed on the support plate, the tension adjustor for adjusting the position of the motor mount along the support plate. In an embodiment, the motor mount includes an opening that accommodates a shaft of the motor, a driver pulley attached to the shaft. A belt is attached to the driver pulley on one side and a return pulley on an opposite side. The support plate is disposed adjacent a wall and above the belt which operates a plurality of sliding doors. In an embodiment, the tension adjustor includes a threaded bolt which, depending on which way turned, either causes the motor mount to slide in a first direction to increase belt tension or slide in a second direction to decrease belt tension.

17 Claims, 4 Drawing Sheets

(56) References Cited

U.S. PATENT DOCUMENTS

| | | | | |
|---|---|---|---|---|
| 3,768,324 A * | 10/1973 | Vanderstegen-Drake | F16H 7/14 | 474/115 |
| 3,834,081 A * | 9/1974 | Catlett | E05F 15/646 | 49/118 |
| 3,872,622 A * | 3/1975 | Berk | E05F 15/60 | 49/118 |
| 4,503,637 A * | 3/1985 | Parente | E05D 15/06 | 49/118 |
| 4,631,044 A * | 12/1986 | Redmon | F16H 7/02 | 248/656 |
| 5,271,181 A * | 12/1993 | Pietro | B60J 5/062 | 49/118 |
| 5,280,309 A * | 1/1994 | Zinsmeyer | G01D 15/24 | 248/665 |
| 5,460,059 A * | 10/1995 | Kato | F16H 19/06 | 108/143 |
| 5,656,898 A * | 8/1997 | Kalina | E05F 15/77 | 318/282 |
| 5,659,160 A * | 8/1997 | Tracey | B66B 13/08 | 187/315 |
| 5,755,060 A * | 5/1998 | Zweili | E05B 65/0829 | 49/322 |
| 6,108,975 A * | 8/2000 | Bailey | E05F 15/63 | 49/334 |
| 6,557,816 B2 * | 5/2003 | Yoshida | B41J 19/005 | 248/557 |
| 7,124,657 B2 * | 10/2006 | Nagai | F16C 29/02 | 74/89.2 |
| 7,181,988 B2 * | 2/2007 | Nagai | F16C 29/063 | 74/89.2 |
| 8,307,877 B1 * | 11/2012 | Lambridis | E05F 17/004 | 160/118 |
| 2002/0056236 A1 * | 5/2002 | Kalempa | E06B 7/16 | 49/478.1 |
| 2005/0037878 A1 * | 2/2005 | Pierjok | F16H 7/14 | 474/101 |
| 2005/0210752 A1 * | 9/2005 | Schulte | E05F 1/046 | 49/360 |
| 2005/0274078 A1 * | 12/2005 | Gilchrist | E05F 15/42 | 49/360 |
| 2010/0269415 A1 * | 10/2010 | Busch | E05F 15/652 | 49/358 |
| 2011/0036016 A1 * | 2/2011 | Knight | E06B 3/94 | 49/360 |
| 2011/0165980 A1 * | 7/2011 | Hoeting | F16H 7/14 | 474/114 |
| 2012/0137592 A1 * | 6/2012 | Gazda | E05D 15/0656 | 49/360 |
| 2013/0310173 A1 * | 11/2013 | Joko | A63F 13/08 | 463/31 |
| 2014/0041305 A1 * | 2/2014 | Gazda | E05D 15/0656 | 49/360 |
| 2014/0251556 A1 * | 9/2014 | Orton | E05F 15/1653 | 160/188 |

* cited by examiner

BELT TENSIONING MOTOR MOUNT

CROSS-REFERENCE TO RELATED APPLICATIONS

This application claims priority of provisional application Ser. No. 61/999,416 to Christopher B. Miller, entitled "BELT TENSIONING MOTOR MOUNT FOR RESIDENTIAL SLIDING DOOR AUTOMATION," filed on Jul. 24, 2014, the subject matter of which is incorporated herein by reference.

BACKGROUND OF THE INVENTION

1. Field of the Invention

The present invention relates to belt tensioning devices, and, more particularly, to a belt tensioning motor mount for motorized sliding doors.

2. Description of the Related Art

Automatic motorized sliding door systems have become increasingly popular in residential construction, particularly in high-end and custom-built homes. Motorized sliding doors are typically hung from head tracks and include rollers that allow the doors to travel along the tracks. In many cases, the doors are mounted in a metal frame with tracks and rollers overhead and on the floor. A bi-directional electric motor is mounted on one side of the sliding doors. A driver pulley is attached to the shaft of the motor and a return pulley is installed on the opposite side of the doors. A belt is attached to the pulleys. The belt includes a belt clamp that moves the doors when the system is operated.

Although such automatic motorized sliding door systems have been well received by home owners, conventional design calls for placement of belt tensioning hardware above the doors in close proximity to the head track. Unfortunately, for new construction, the head track often will come into come into contact with the belt tensioning hardware as the house settles, interfering with operation of the doors.

SUMMARY OF THE INVENTION

One aspect of the disclosure relates to a belt tensioning motor mount for a motorized sliding door. The belt tensioning motor mount comprises a support plate; a motor mount capable of holding a motor, the motor mount slidably attached to the support plate; and a tension adjustor disposed on the support plate, the tension adjustor for adjusting the position of the motor mount along the support plate. In an embodiment, the motor mount includes an opening that accommodates a shaft of the motor, a driver pulley attached to the shaft. A belt is attached to the driver pulley on one side and the return pulley on an opposite side. The support plate is installed adjacent a wall and above the belt which runs horizontally to operate a plurality of sliding doors.

In operation, belt tension can be adjusted by sliding the motor mount horizontally along the support plate. In an embodiment, the support plate includes at least one groove to facilitate the sliding. Belt tension is increased by sliding the motor mount along the support plate so as to cause the driver pulley to be moved away from the return pulley thereby tightening the belt. In an embodiment, the tension adjustor includes a threaded bolt disposed longitudinally which pushes the motor mount along the groove to tighten the belt when it is turned in a first (e.g. clockwise) direction. When the bolt is turned in a second direction (e.g., counterclockwise), the tension from the belt will be reduced. Use of the threaded bolt allows the belt tension to be adjusted in small, precise increments.

DETAILED DESCRIPTION OF THE INVENTION

Figure 1:
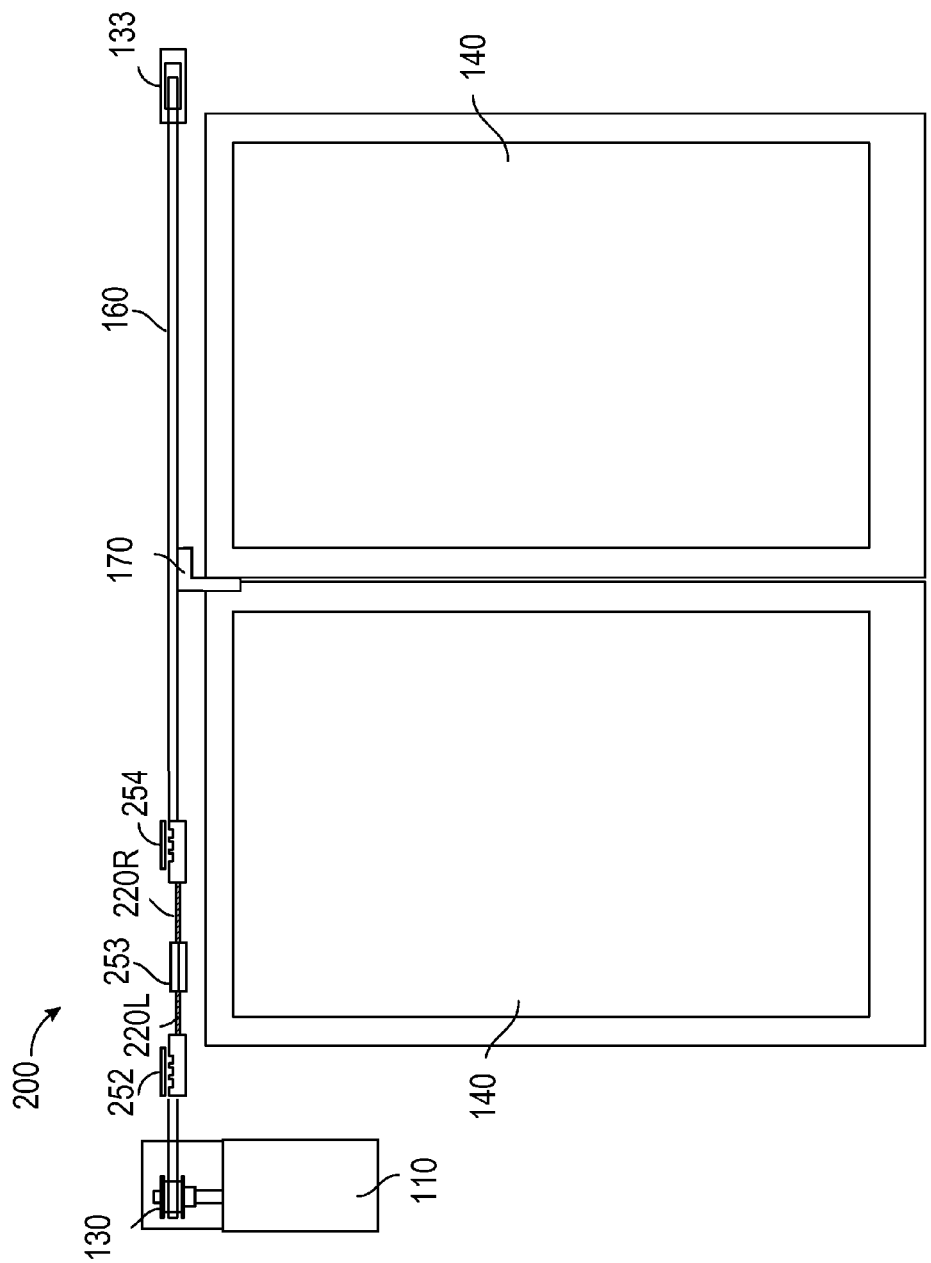
FIG. 1 illustrates a motorized sliding door system having a prior art belt tensioning device.

Referring to FIG. 1, a motorized sliding door system having a prior art belt tensioning device 200, is illustrated. The motorized sliding door system includes a plurality of sliding doors 140. Although not shown, it is to be understood that the sliding doors 140 may be hung from head tracks and include rollers that allow the doors 140 to travel along the tracks. A bi-directional electric motor 110 is mounted on one side of the sliding doors 140. A driver pulley 130 is attached to the shaft of the motor 110 and a return pulley 133 is installed on the opposite side. A belt 160 is attached to the pulleys 130, 133. The belt 160 includes a belt clamp 170 attached to at least one of the doors 140. When the motor 110 is activated, the belt 160 moves along the pulleys 130, 233 and the belt clamp 170 moves the doors 140.

However, because the belt 160 can become loose over time, the belt 160 must be periodically tightened. As shown, the belt tensioning device 200 is interdisposed between ends of the belt 160, and essentially makes up a section of the belt 160. The belt tensioning device 200 includes a first belt tightening portion 252, a first threaded portion 220L, a second belt tightening portion 253, a second threaded portion 220L, and a third belt tightening portion 254. The first belt tightening portion 252 is clamped on one end of the belt 160 and the third belt tightening portion 254 is clamped on the other end of the belt 160, as shown. The first threaded portion 220L is a threaded connector that connects the first belt tightening portion 252 and the second belt tightening portion 253 via corresponding threaded holes. The second threaded portion 220R is a threaded connector that connects the third belt tightening portion 254 and the second belt tightening portion 253 via corresponding threaded holes. The direction of the threads for the first threaded portion 220L and the second threaded portion 220R will preferably be opposite. To adjust the tension of the belt 160, the user turns the second belt tightening portion 253 (e.g., clockwise to increase the tension; counterclockwise to decrease the tension).

Although for explanatory purposes the belt tensioning device 200 is shown exposed, it is to be understood that the belt tensioning device 200 would be covered and hidden from view. In many cases, the belt tensioning device 200 can be difficult to reach and service. Additionally, for new construction, the head track often will come into come into contact with the belt tensioning device 200 as the house settles, interfering with operation of the doors 140.

Figure 2:
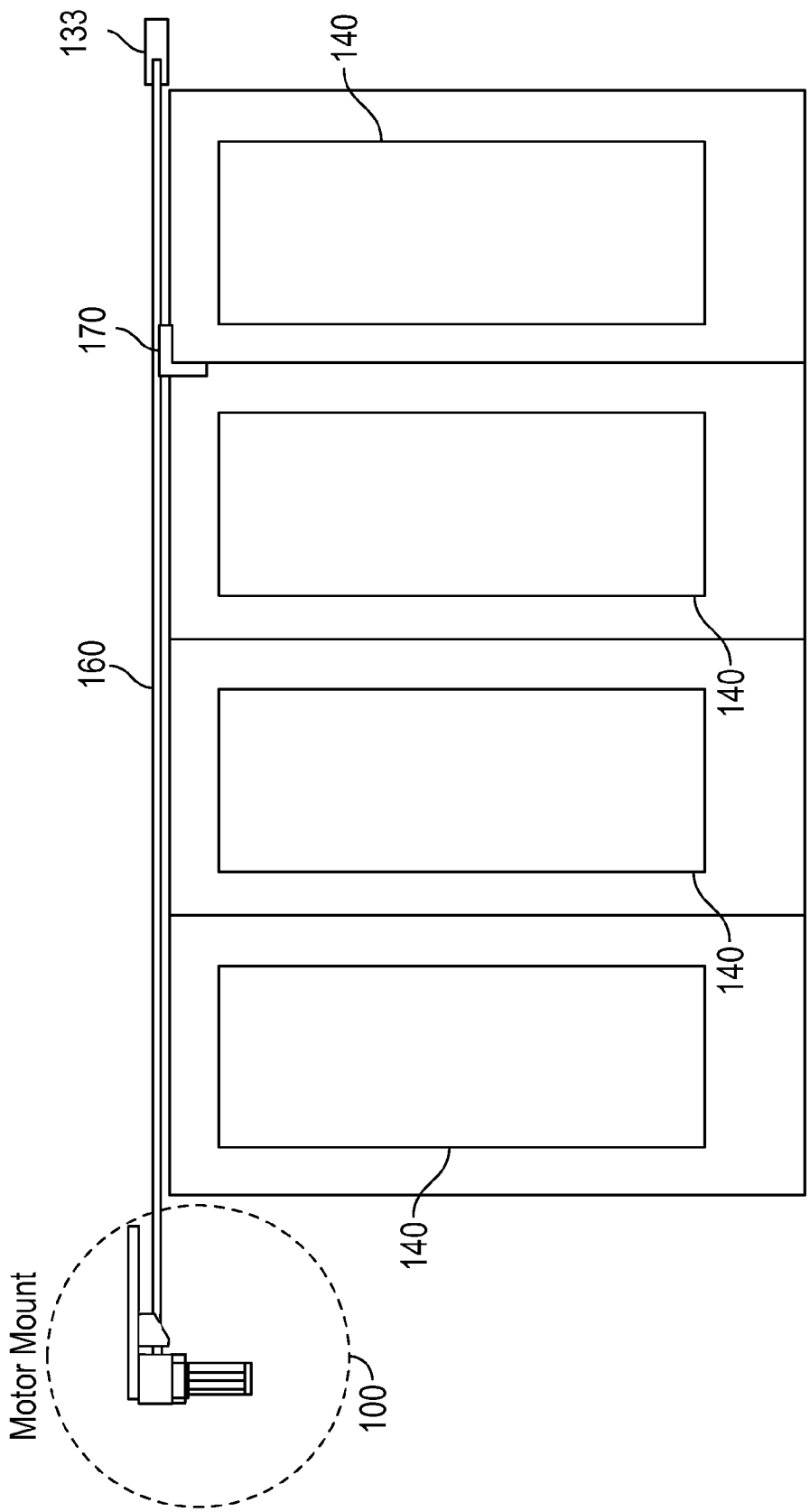
FIG. 2 illustrates a motorized sliding door system having a belt tensioning motor mount, according to an embodiment of the present invention.

Referring to FIG. 2, a motorized sliding door system having a belt tensioning motor mount 100, according to an embodiment of the present invention, is illustrated. As shown, the sliding door system of FIG. 2 is substantially the same as above except that a belt tensioning motor mount 100 is used. Furthermore, four sliding doors 140 are depicted in FIG. 2 while only two sliding doors 140 are shown in FIG. 1. However, it is to be understood that this difference is of no significance. It is further to be understood that the belt tensioning motor mount 100 described herein can be used with any number of doors 140.

Figure 3:
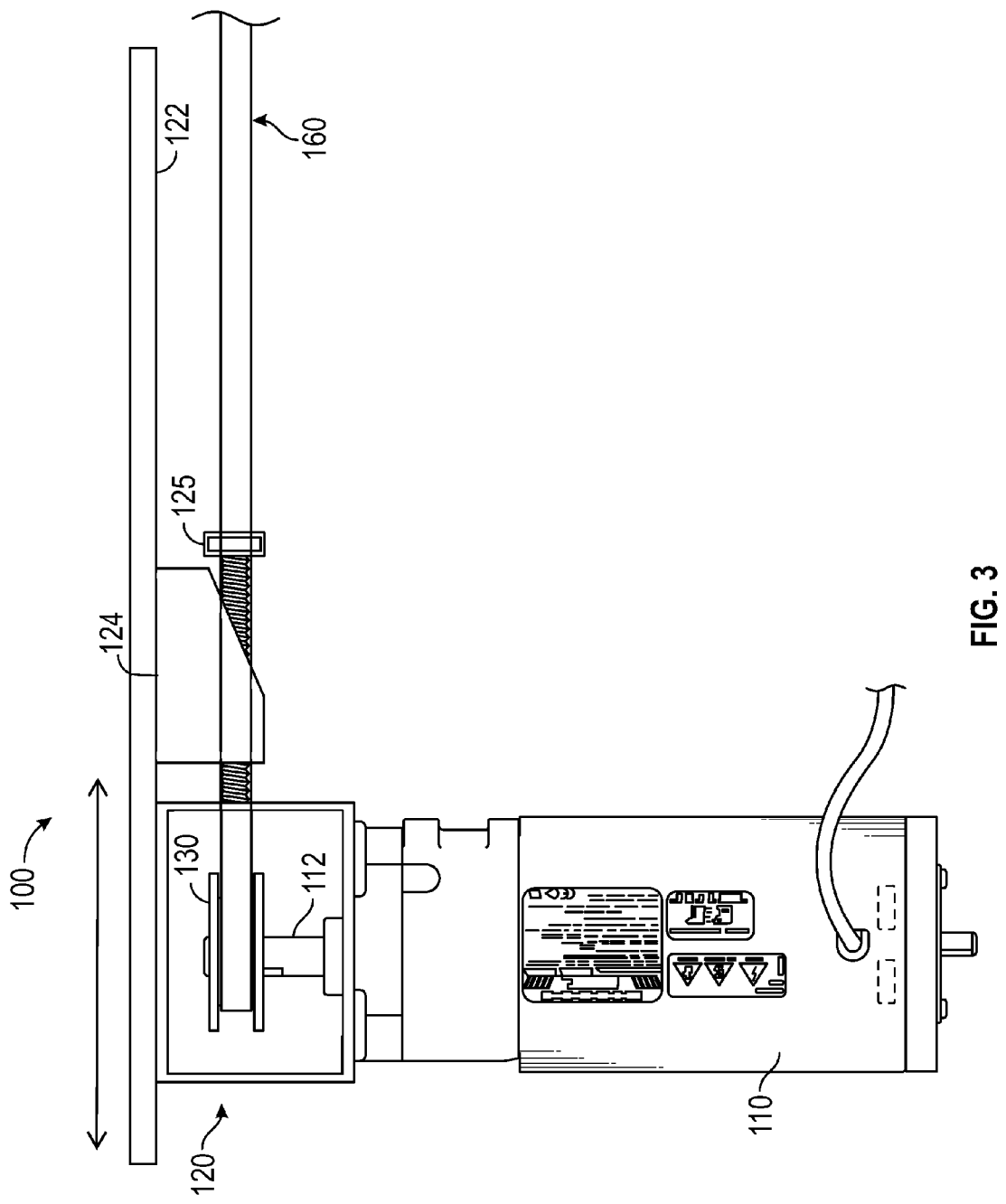
FIG. 3 illustrates a side close-up view of the belt tensioning motor mount of FIG. 2.

Referring to FIG. 3, a side close-up view of the belt tensioning motor mount 100, is illustrated. As shown, the belt tensioning motor mount 100 includes a support plate 122, a motor mount 120 and a tension adjustor 124. The motor mount 120 includes an opening (135, FIG. 4) that accommodates a shaft 112 of the motor, the driver pulley 130 attached to the shaft 112. The belt 160 is attached to the driver pulley 130 on one side and the return pulley 133 (FIG. 2) on an opposite side. The support plate 122 is installed adjacent a wall and above the belt 160 which runs horizontally to operate a plurality of sliding doors 140. The motor mount 120 holds the motor 110 and is slidably attached to the support plate 122. The tension adjustor 124 is disposed on the support plate 122. In operation, belt tension can be adjusted by sliding the motor mount 120 horizontally along the support plate 122. More particularly, belt tension is increased by sliding the motor mount 120 along the support plate 122 so as to cause the driver pulley 130 to be moved away from the return pulley 133, thereby tightening the belt 160. In the illustrated example of FIG. 3, this would involve moving the motor mount 120 in a leftward direction across the support plate 120. To accomplish moving the motor mount 120 to increase belt tension, the tension adjustor 124 can be used. More specifically, a threaded bolt 125 of the tension adjustor can be turned in a first direction (e.g., in a clockwise direction) to have the threaded bolt 125 push the motor mount 120 in the leftward direction. When the threaded bolt 125 is turned in a second direction (e.g., counter-clockwise), the tension from the belt will pull the motor mount 120 in a rightward direction thereby releasing belt tension. Advantageously, use of the threaded bolt 125 allows the belt tension to be adjusted in small, precise increments. Although the tension adjustor 124 is used to incrementally adjust belt tension, it is to be understood that another such mechanism could be used. For example, the motor mount 120 could be attached to the support plate with a bolt/butterfly nut combination or a knob wherein once sufficiently untightened, the motor mount could be repositioned by hand, for example.

Figure 4:
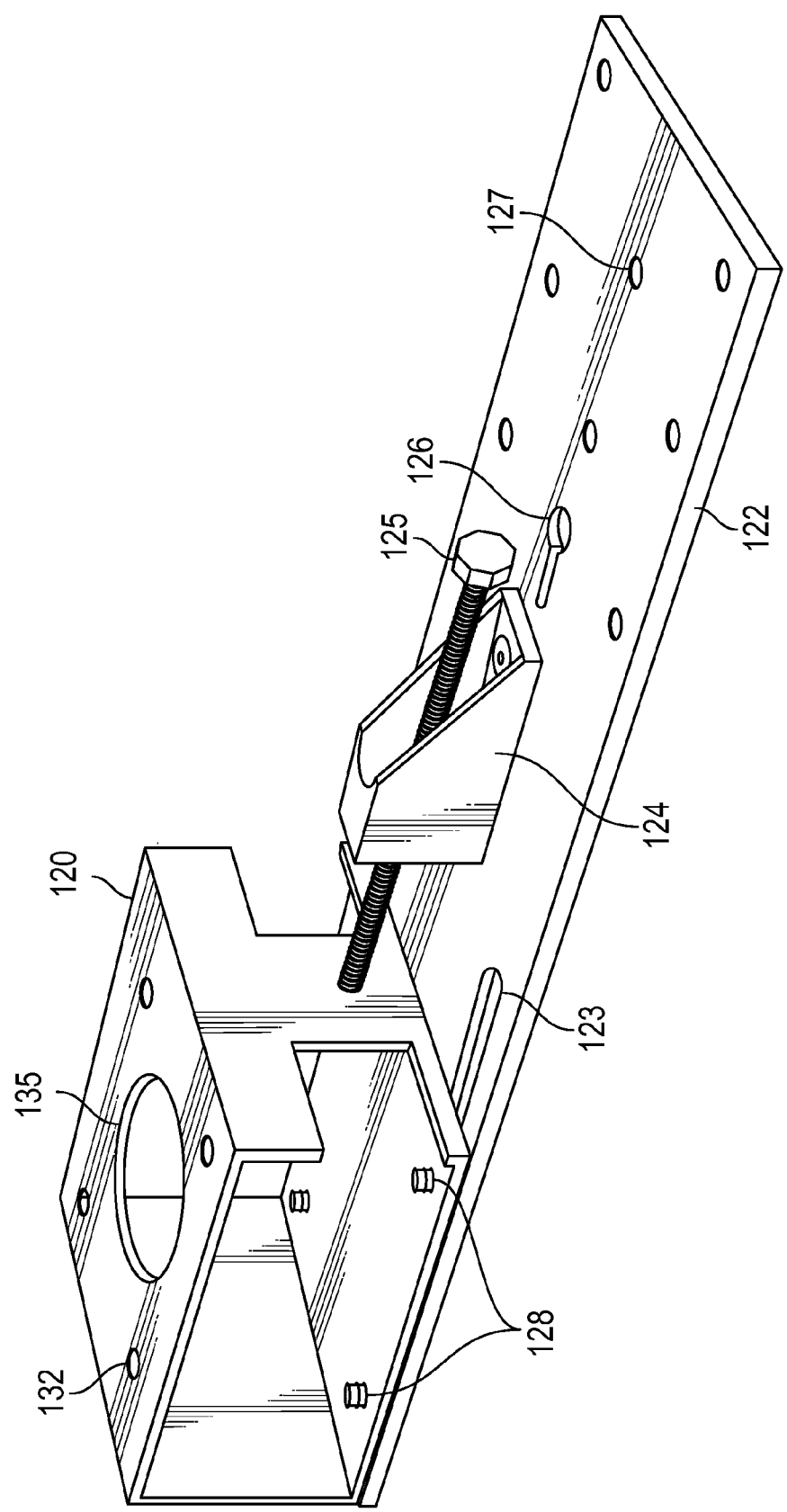
FIG. 4 illustrates a perspective view of the belt tensioning motor mount with the motor and driver pulley removed.

Referring to FIG. 4, a perspective view of the belt tensioning motor mount 100, is illustrated. FIG. 4 shows the belt tensioning motor mount 100 in an "upside down" orientation and with the motor 110 removed. In this view, it can be seen that the motor mount 120 is shaped as a rectangular box. It is to be understood, however, that the motor mount 120 could assume a different shape, e.g., cylindrical. The motor mount 120 includes the opening 135 to accommodate the shaft 112 of the motor 110 (FIG. 3). The motor mount 120 also includes a pair of slots which accommodate the belt 160. In practice, the belt 160 will not be a continuous loop, but rather a single strip steel belted belt or Kevlar timing belt wherein distal ends of the belt 160 are attached to respective pulley 130, 133. To facilitate repositioning of the motor mount 120 across the support plate 120, grooves 123 can be formed into the support plate 122. As shown, the motor mount 120 is attached to the support plate 122 by way of screws 128. The screws extend through corresponding threaded holes in the support plate 122, the grooves 123, and corresponding threaded holes in the motor mount 120. The diameter of the screws 128 can be slightly less than the width of the grooves 128. To allow the motor mount 120 to freely slide across the support plate 122, the screws 128 should not be on tight (i.e., the clamping force of the screws 128 should allow sliding of the motor mount 120 without undue difficulty). Alternatively, the mounting plate 120 could be slidably attached to the support plate 120 using rivets instead of the screws 128, or by way of another mechanism (e.g., by interlocking parts). As can also be seen, the support plate 122 includes a plurality of mounting holes 127 that allow the support plate 122 to be screwed or bolted to a door frame, ceiling, etc. Hole 126 facilitates adjustment of the device during installation.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A belt tensioning motor mount, comprising:
   a support plate;
   a motor mount box including a top side, a bottom side and an interior, the top side slidably attached to the support plate, the bottom side attachable to a motor and including an opening that accommodates a shaft of the motor extending vertically and upwardly through the opening, and the interior accommodating the motor shaft and a driver pulley attached thereto; and
   a tension adjustor disposed on the support plate and connected directly to the motor mount box on a side of the motor mount box that includes at least one slot for allowing passage of a belt attached to the driver pulley, the tension adjustor for adjusting the position of the motor mount box along the support plate.

2. The belt tensioning motor mount of claim 1, wherein the support plate is disposed adjacent a wall and above the belt.

3. The belt tensioning motor mount of claim 2, wherein the belt operates sliding doors.

4. The belt tensioning motor mount of claim 3, wherein tension of the belt is adjusted by sliding the motor mount box along the support plate.

5. The belt tensioning motor mount of claim 4, wherein the support plate includes at least one groove to facilitate the sliding.

6. The belt tensioning motor mount of claim 4, wherein the tension is increased by sliding the motor mount box along the support plate so as to cause the driver pulley to be moved away from the return pulley.

7. The belt tensioning motor mount of claim 4, wherein the tension is decreased by sliding the motor mount box along the support plate so as to cause the driver pulley to be moved toward the return pulley.

8. The belt tensioning motor mount of claim 1, wherein the tension adjustor is capable of being used to adjust the tension of the belt.

9. The belt tensioning motor mount of claim 8, wherein the tension adjustor includes a threaded bolt.

10. A sliding door control system, comprising:
    a motor;
    a motor mount securing the motor, the motor mount comprising a motor mount box having an opening wherein a shaft of the motor extends vertically through the opening into an interior of the motor mount box;

a driver pulley disposed in the interior of the motor mount box and attached to the shaft, the shaft being capable of driving the driver pulley;

a return pulley;

a belt, the belt secured on one end by the driver pulley and on the other end by the return pulley, and capable of causing at least one door to slide along a rail when the driver pulley is driven by the motor;

a support plate disposed above the belt, the motor mount box slidably attached to the support plate; and a tension adjustor disposed on the support plate and connected directly to the motor mount box on a side of the motor mount box that includes at least one slot for allowing passage of the belt attached to the driver pulley, the tension adjustor for adjusting the position of the motor mount box along the support plate.

11. The sliding door control system of claim 10, wherein the support plate disposed above the belt is disposed adjacent a wall.

12. The sliding door control system of claim 10, wherein the support plate includes at least one groove to facilitate the sliding of the motor mount box.

13. The sliding door control system of claim 10, wherein tension of the belt is increased by sliding the motor mount box along the support plate so as to cause the driver pulley to be moved away from the return pulley thereby tightening the belt.

14. A belt tensioning motor mount, comprising:
a motor having a vertically oriented shaft;
a support plate;
a motor mount box holding the motor, the motor mount box slidably attached to the support plate, the motor mount box including an opening that accommodates the shaft of the motor, wherein the shaft upwardly extends;
a tension adjustor disposed on the support plate and connected directly to the motor mount box on a side of the motor mount box that includes at least one slot for allowing passage of a belt attached to a driver pulley, the tension adjustor capable of adjusting the position of the motor mount box along the support plate;
the driver pulley is attached to the shaft;
wherein the belt is attached to the driver pulley on one side of the belt and a return pulley on an opposite side of the belt; and
wherein the support plate is disposed adjacent a wall and above the belt.

15. The belt tensioning motor mount of claim 14, wherein the belt operates sliding doors.

16. The belt tensioning motor mount of claim 14, wherein the tension adjustor includes a bolt that is capable of being used to slide the motor mount box.

17. The belt tensioning motor mount of claim 14, wherein the bolt is a threaded bolt.

* * * * *